United States Patent [19]
Briggs

[11] 3,858,731
[45] Jan. 7, 1975

[54] IRRIGATION PIPE HANDLING APPARATUS

[76] Inventor: Stanley E. Briggs, Rt. 1, Hesston, Kans. 67062

[22] Filed: Dec. 5, 1973

[21] Appl. No.: 421,982

[52] U.S. Cl. ............. 214/1 PA, 214/506, 214/51 S, 214/518
[51] Int. Cl. ............................................. B60p 1/00
[58] Field of Search ..................................... 29/431; 214/515–517, 519, 1 PA, 1 P, 6 H, 501, 50 S, 506, 508, 518, 83, 83.1, 83.14, 83.18

[56] References Cited
UNITED STATES PATENTS

| | | | |
|---|---|---|---|
| 2,780,376 | 2/1957 | Sanders | 214/1 PA X |
| 2,925,186 | 2/1960 | Anderson | 214/517 X |
| 3,034,668 | 5/1962 | Wicks | 214/1 PA X |
| 3,400,844 | 9/1968 | Overstreet | 214/517 |
| 3,630,392 | 12/1971 | Cintract | 214/1 P |

FOREIGN PATENTS OR APPLICATIONS

564,182  10/1958  Canada ........................... 214/83.14

*Primary Examiner*—Frank E. Werner
*Attorney, Agent, or Firm*—D. Paul Weaver

[57] ABSTRACT

An apparatus for picking up irrigation pipe in the field has power components to separate the bell and spigot ends of adjacent pipe sections and to convey them in orderly layers to storage and transporting racks. In a reverse mode of operation, the pipe sections are delivered from the storage and transporting racks by conveyer means to coupling and pipe laying components of the apparatus. Means are provided to orient the pipe gates so that the same are properly positioned when the pipe is laid to direct irrigation water into the furrows between crop rows. The apparatus possesses automatic controls.

28 Claims, 19 Drawing Figures

IRRIGATION PIPE HANDLING APPARATUS

BACKGROUND OF THE INVENTION

Machines are known in the prior art for transporting and laying down irrigation pipe and for retrieving such pipe from the field. An example of the patented prior art is contained in U.S. Pat. No. 2,780,376 issued Feb. 5, 1957 to R. M. Sanders.

An objective of this invention is to improve upon the known prior art by the provision of an irrigation pipe laying, retrieving, coupling, uncoupling and transporting apparatus which has much greater versatility of operation and which is automated to a greater extent than the prior art, thus rendering the apparatus virtually free of manual control.

A further objective of the invention is to provide an apparatus of the mentioned type which, considering its increased capability, is more simplified than the prior art in construction and operation and more economical to manufacture and maintain, as well as being rugged and durable.

More particularly, the apparatus of the invention has a unique ability to assure that the water discharge gates of all irrigation pipe sections are properly positioned when the pipe is laid down to direct water into the furrows between crop rows, which is absolutely essential for proper irrigation. No other known apparatus in the prior art has this capability.

Other features and advantages of the invention will become apparent during the course of the following description.

DETAILED DESCRIPTION

The apparatus embodying the invention has the capability of picking up, disconnecting, conveying and racking up to fifty sections of irrigation pipe in the field, said sections measuring 30 feet long each. When the sections are loaded or racked, the entire load of pipe with the supporting rack may be discharged as a unit from the rear end of the trailer. At this time, another empty rack may be placed on the trailer and another irrigation pipe line may be picked up and loaded, if desired. Following this, the apparatus may be utilized to lay the irrigation pipe in the field properly coupled and with the pipe gates properly oriented to direct water into the irrigation furrow, ready for connection to a source of water. The rack of pipe that was unloaded as a unit can be reloaded and layed out ready for use. The pipe laying operation is carried out with the towing tractor coupled to the rear end of the trailer.

Strategically located limit switches and associated hydraulic controls provide a smooth automatic sequence of operation in both the pipe loading and unloading modes.

Figure 2:
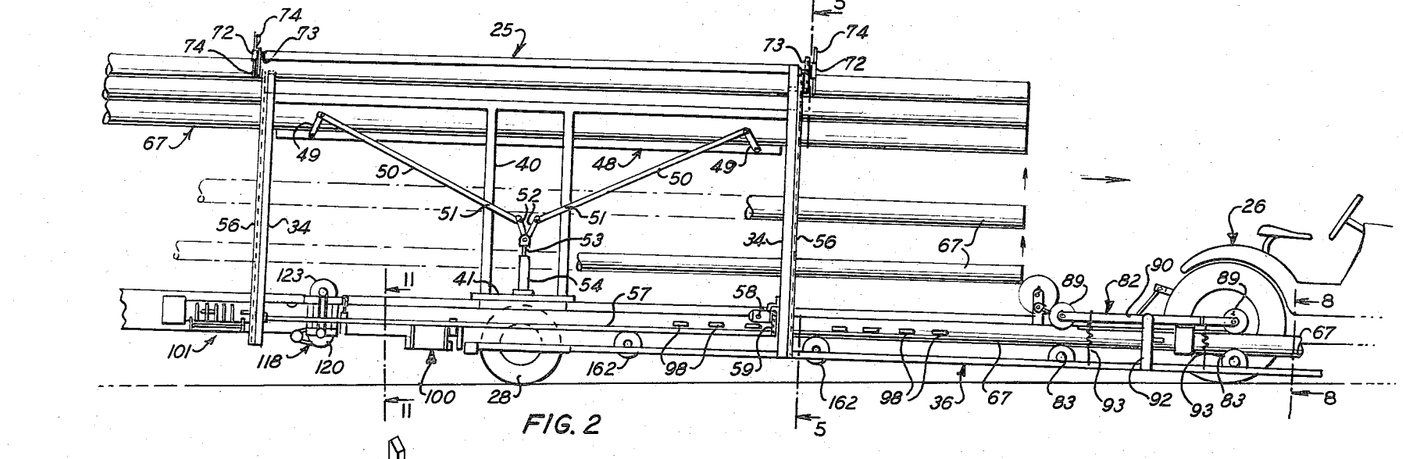
FIG. 2 is a side elevation of the apparatus in a pipe retrieving and loading mode.
Figure 3:
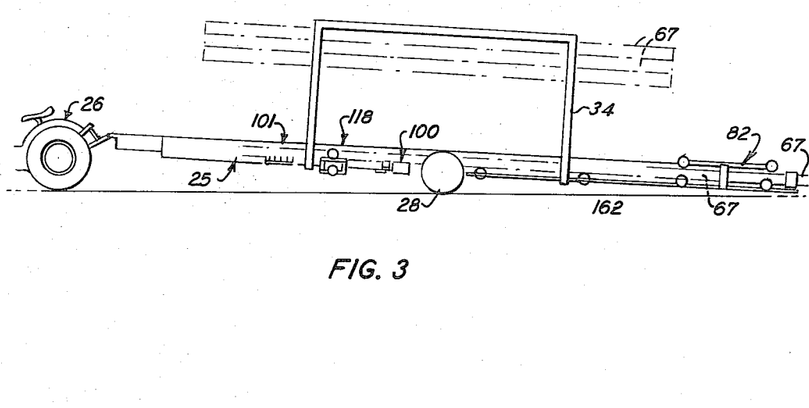
FIG. 3 is a partly diagrammatic side elevation of the apparatus in a pipe unloading and laying mode.

Referring to the drawings in detail, wherein like numerals designate like parts, the numeral 25 designates generally a trailer which is drawn by a suitable tractor 26 in both the pipe retrieving and pipe laying operations illustrated by FIGS. 2 and 3, respectively. The trailer 25 comprises a generally level bed frame 27, suitably supported on free-turning ground wheels 28 near the longitudinal center thereof. At its forward end, the trailer 25 has a pivoted vertically swingable draft tongue 29 adapted to be coupled to the tractor hitch and the angle of this draft tongue is adjusted by a power cylinder 30 on the front of bed frame 27 to cause the bed frame to assume the required inclinations relative to the ground for loading and unloading, as will be further described. A winch drum 31 having a cable thereon and driven by a hydraulic motor 32 is also mounted on the forward end of the trailer bed frame and the use of this winch drum will be further described.

Figure 1:
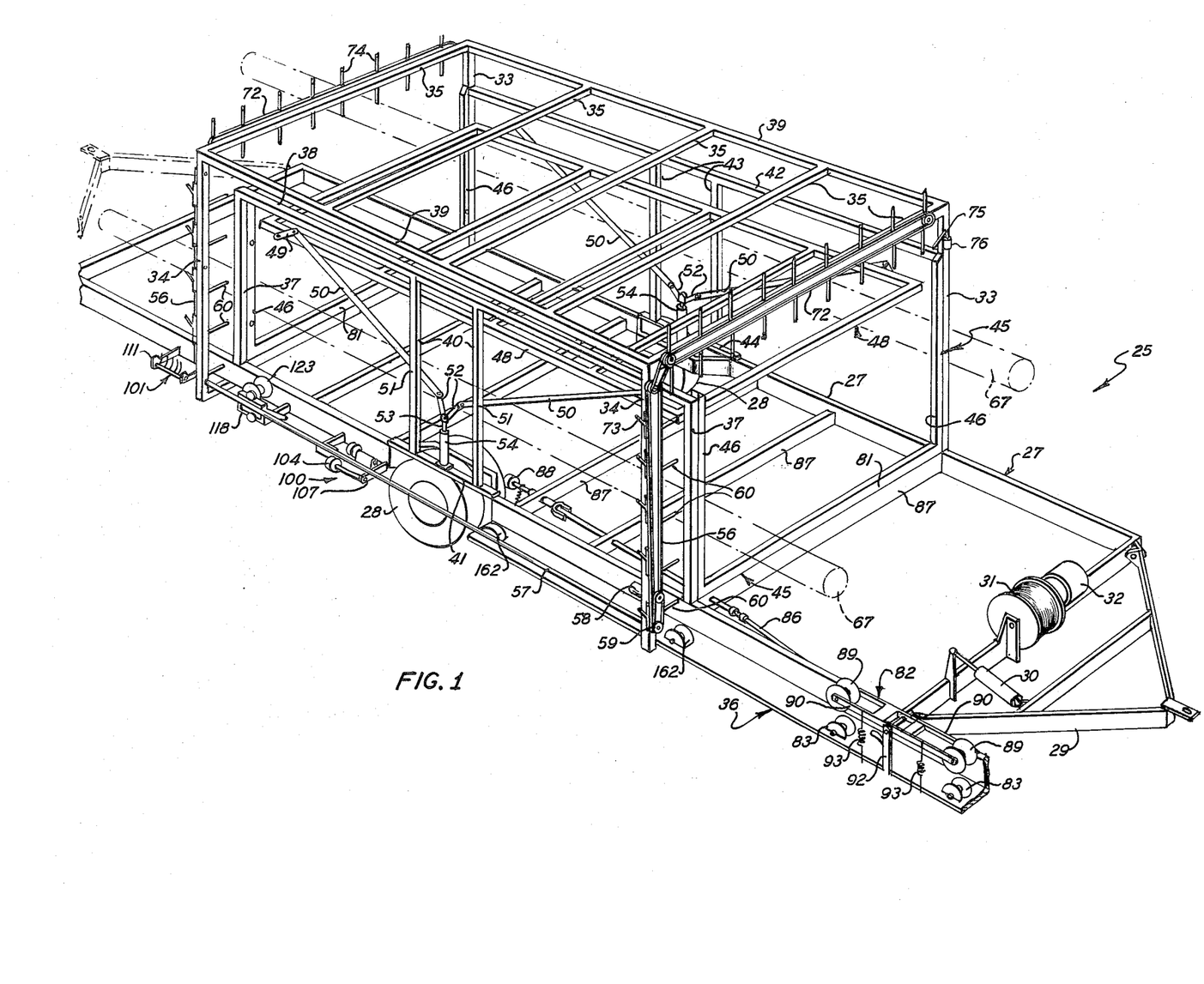
FIG. 1 is a perspective view of a pipe laying, retrieving and transporting apparatus embodying the invention.

The trailer 25 further comprises a box-like rectangular frame rigid with the bed frame 27 and including vertical corner posts 33 and 34 connected by transverse cross bars or braces 35, as best shown in FIG. 1. The posts 34 extend below the bed frame 27, FIG. 5, and the forward post 34 is rigidly connected with an angle bar 36 which extends longitudinally forwardly of the rectangular frame to the forward end of the bed frame 27 or slightly therebeyond as shown in FIGS. 1 and 2. The rear post 34 is suitably rigidly tied into one side of the bed frame 27, which bed frame extends considerably beyond opposite ends of the rectangular framework.

Additional fixed posts 37 are spaced inwardly of posts 34 and rest directly on the adjacent longitudinal member of bed frame 27. The tops of these latter two posts 37 are rigidly interconnected by a longitudinal bar 38, and similarly longitudinal bars 39 interconnect the tops of posts 33 and 34 and are also secured to the several cross bars 35. Adjacent to one wheel unit 28, FIG. 1, additional vertical posts 40 have their tops rigid with longitudinal bar 38 and their bottoms securely mounted on a fixed bar member 41.

Similarly, at the opposite side of the trailer, a longitudinal frame bar 42 rigidly interconnects posts 33 somewhat below the bar 39, and vertical posts 43 laterally opposed to the posts 40 descend from the bar 42 with their lower ends rigidly secured to a member 44, FIG. 7, above the adjacent wheel 28.

Figure 4:
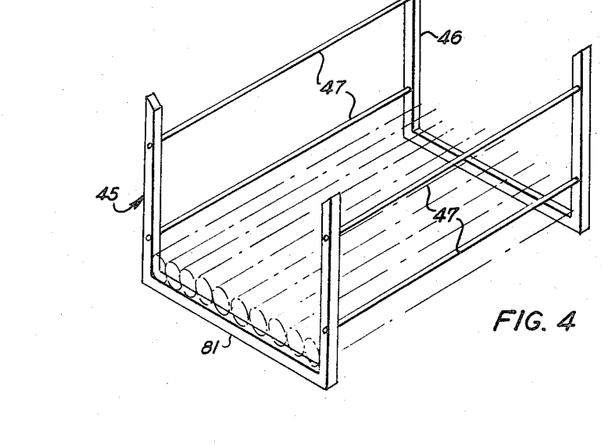
FIG. 4 is a perspective view of a storage rack for separated pipe sections.
Figure 5:
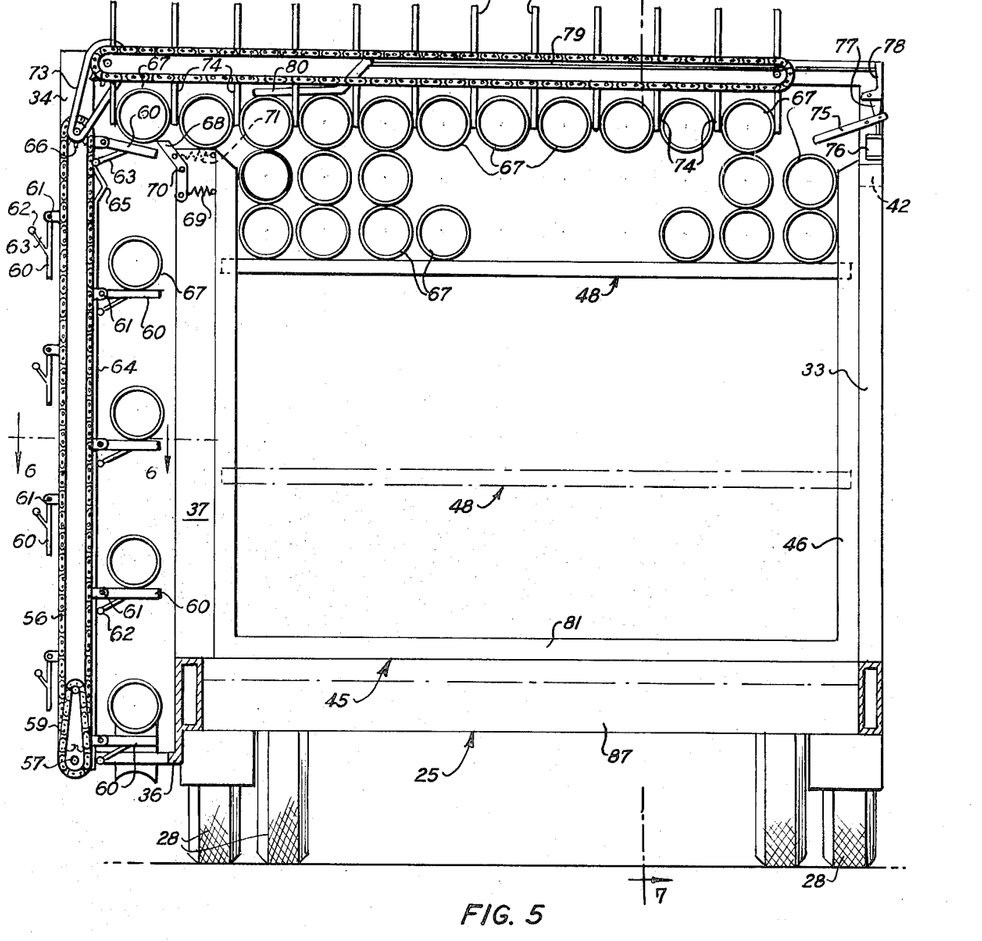
FIG. 5 is an enlarged transverse vertical section taken on line 5—5 of FIG. 2.

A removable pipe rack 45 depicted in FIG. 4 and also shown in FIG. 1 is adapted to rest on the trailer bed frame 27 between posts 33 and 37 snugly, as shown in FIG. 5. This rack consists of two simple U-shaped frames 46 adapted to be tied together by four longitudinal side tie rods 47 which are put into place if it is desired to unload the rack and the pipe sections therein as a unit from the trailer 25. Otherwise, as depicted in FIG. 1, the two U-shaped frames 46 are not tied together but are separately placed upon the trailer bed.

Figure 7:
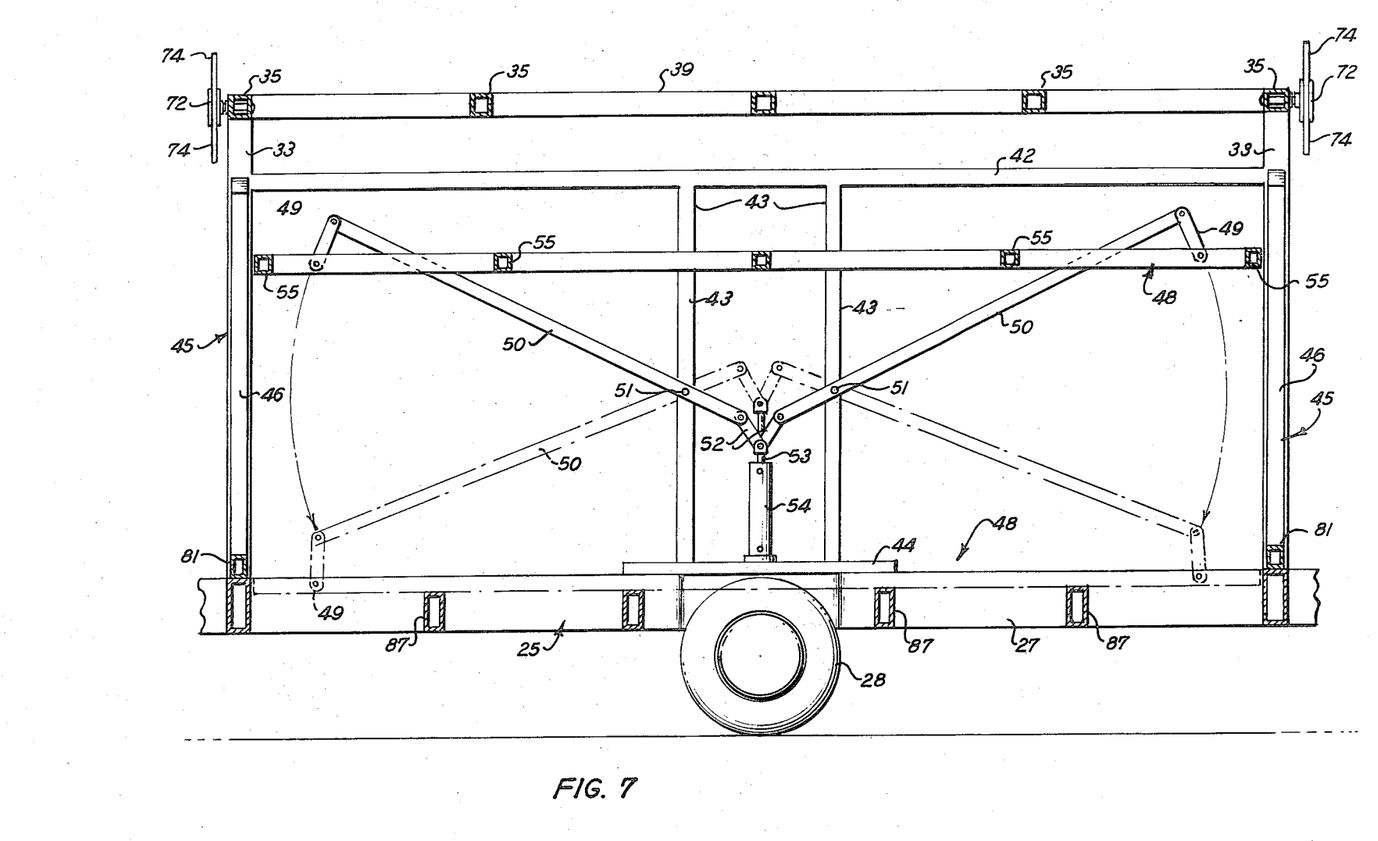
FIG. 7 is a vertical section taken on line 7—7 of FIG. 5.

A horizontal pipe elevating and lowering frame or platform 48 is arranged for vertical movement between the posts 33 and 37 and extends substantially between the fore and aft U-shaped frames 46 of the pipe rack, FIG. 7. The opposite sides of this pipe elevating and lowering means are supported by short pivoted links 49, connected to long levers 50 which are pivoted between their ends at 51 to the posts 43 and 40 at the opposite sides of the trailer. The shorter end portions of levers 50 in turn are pivotally connected with pairs of scissor links 52, which in turn are pivoted to the vertically extensible and retractable piston rods 53 of upstanding hydraulic cylinders 54 at the opposite sides of the trailer, resting on the members 41 and 44, FIGS. 1 and 7. As shown by full lines and broken lines in FIGS. 5 and 7, the platform 48 is movable vertically from an uppermost elevation near the tops of U-shaped frames 46 to a lowermost elevation at the bottoms of these frames and such movement is provided by the simultaneous operation of the two hydraulic cylinders 54, to be further described. The elevating platform 48 is rectangular and remains level in all elevations and has plural cross braces 55 for rigidity.

In conjunction with the pipe elevating and lowering means above-described, additional means are provided to convey pipe sections to and from the platform 48 as a part of the total operation of picking up irrigation pipe from the field or laying it down. Continuing to refer to the drawings, such pipe section conveyor means comprises endless vertically traveling conveyor chains 56 on the fore and aft sides of outboard posts 34, connected at their lower ends for unison operation by longitudinal drive shaft 57. The two vertical conveyor chains 56 are powered by a hydraulic motor 58 and intermediate gearing 59, as required, to operate the two chains at the same speeds and in the same direction.

Figure 6:
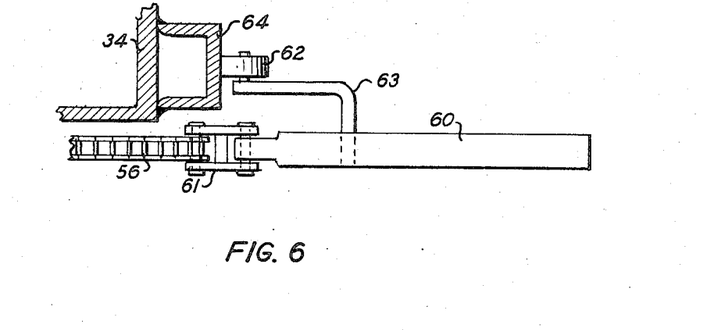
FIG. 6 is an enlarged fragmentary horizontal section taken on line 6—6 of FIG. 5.

At equally spaced intervals along the chains 56, pipe lifter pins 60 are pivoted through short connector links 61, FIG. 6, with the chain links proper so as to travel therewith. Cam follower rollers 62 mounted on arms 63 rigid with the pins 60 and disposed at thereto, FIG. 5, are adapted to engage and follow a cam track 64 attached to the inner side of each post 34. This cam track is straight from its lower end to a point near its top where it is possessed of an inwardly directed hump or lobe 65, FIG. 5. On the entire straight portion of the cam track, the follower rollers 62 and arms 63 maintain the pipe supporting pins 60 extended inwardly horizontally. Upon engaging the lobe 65 of cam track 64, each roller 62 and arm 63 causes the associated pin 60 to raise, accelerating the pipe upward until the roller 62 passes over lobe 65; this allows dog 68 to move under the pipe and as soon as roller 62 starts down lobe 65 (back side), the dog 68 then supports the pipe 67 and pin 60 continues to lower until it will pass under the irrigation pipe 67, see FIG. 5, and after leaving the cam track and passing around the sprocket gear 66 at the top of chain 56, the pins 60 assume free-hanging positions on their pivots while descending with the outer side of each chain. In making this transition, the respective pins 60 of the vertical conveyor chains transfer each pipe section 67 to dog 68 and then to a horizontal conveyor means at the top of the rectangular framework, now to be described. Dogs 68 support each pipe section momentarily during transfer from the vertical to the horizontal conveyor means. During a reverse process for unloading and laying irrigation pipe, to be described, the return springs 69 of dogs 68 are removed and attached to the dogs on the upper sides of their pivots 70 by means of additional openings 71 provided for this purpose.

The horizontal conveyor means above-referred to comprises endless horizontal conveyor chains 72 mounted on the forward and rearmost transverse bars 35 and drivingly interconnected with the vertical chains 56 by gearing 73 so that the vertical and horizontal conveyors will operate in unison. The horizontal chains 72 have rigid pusher pins 74 thereon at equidistantly spaced points along the chains. As shown in FIG. 5, the pusher pins 74 traveling with the lower run of each chain 72 engage the pipe sections 67 in succession at the tops of the vertical conveyors and while they are momentarily supported by the dogs 68 during the transition from vertical to horizontal movement. The pins 74, upon engaging each pipe section, move it laterally and horizontally away from the vertical conveyor chains 56 and onto the elevator platform 48 when the same is in the elevated position shown in FIG. 7 and FIG. 5 in full lines. This position of the platform 48 prevails when the piston rods 53 are retracted. Upon sliding onto the platform 48 or onto previously transferred layers of pipe sections 67 thereon, the pins 74 feed the pipe sections horizontally to the right in FIG. 5 in a distinct horizontal layer until the leading pipe section 67 engages and depresses a pivoted control lever 75 of a hydraulic control valve 76 which controls the operation of the two hydraulic cylinders 54. When the lever 75 is thus engaged and depressed, the piston rods 53 will begin to extend upwardly from cylinders 54 and the elevator platform 48 will begin to descend until the lever 75 is released by the particular pipe section 67 which is being lowered. Upon such release, the descent of platform 48 will be halted at the proper elevation to receive the next layer of pipe sections. Each succeeding layer is deposited onto the platform 48 by the horizontal conveyor chains 72 in the abovedescribed manner and the operation is repetitive until such time as the platform 48 has reached the lower limit of its movement caused by full extension of the rods 53. In such lowermost position, the platform 48 descends below the bottom bars 81 of U-frames 46, so that the loaded rack 45 will be able to slide rearwardly for unloading of pipe as described without interference by platform 48. This condition is shown in broken lines in FIG. 7.

When this condition is reached, 50 of the pipe sections 67 will have been loaded by the conveyor means and elevator platform 48 into the rack composed of the two U-shaped frames 46. At this time, if it is desired to unload all of the pipe as a unitary load with the rack, the tie rods 47 are installed, FIG. 4, and the trailer bed is tilted by utilization of the cylinder 30 so that its rear end is depressed and its front end is elevated. This allows the loaded rack 45 to slide safely off the rear of the trailer. A new rack composed of two more U-frames 46 may now be mounted on the trailer and the apparatus will be ready to pick up another string of irrigation pipe. Alternatively, the operator can reload the rack 45 filled with pipe by using the hydraulic-powered winch spool 31 and the cable thereon to pull the load pipe rack onto the tilted trailer. Another option is to hook up the tractor 26 to the rear end of the trailer 25 and the load of pipe on the trailer can be unloaded and placed in the field properly oriented with respect to the water discharge gates and connected and ready for use. This pipe unloading mode of operation is shown in FIG. 3 and will be further discussed.

Continuing to refer to FIG. 5, the lever 75 which controls the lowering of platform 48 is disconnected for unloading and link 77, crank 78 and rod 79 are connected with a feeler lever 80 which senses the presence of each layer of pipe sections 67. As the pipe sections 67 are moved horizontally by conveyor 72 until the last pipe 67 passes under feeler lever 80, and 80 is allowed to swing down opening hydraulic control 76, allowing oil under pressure to enter the top end of hydraulic cylinders 54 which retract the cylinder 54, raising platform 48 until the pipe 67 of the next row strikes feeler lever 80 and raises it until the valve 76 is neutralized shutting off the oil to cylinders 54. This cycle will repeat when the last pipe 67 of the top row is moved to vertical conveyor 56.

Figure 8:
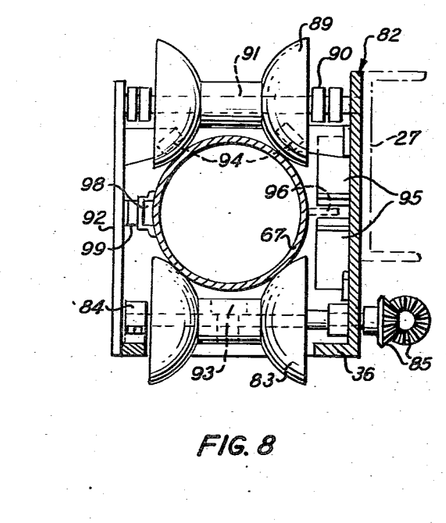
FIG. 8 is an enlarged fragmentary vertical section taken on line 8—8 of FIG. 2.
Figure 9:
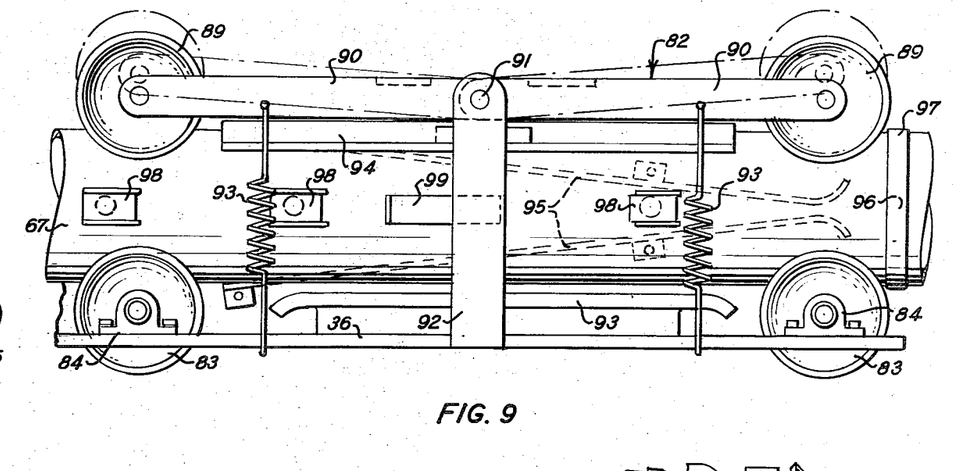
FIG. 9 is an enlarged fragmentary side elevation of a power-operated pipe guiding and feeding and orientation means.
Figure 10:
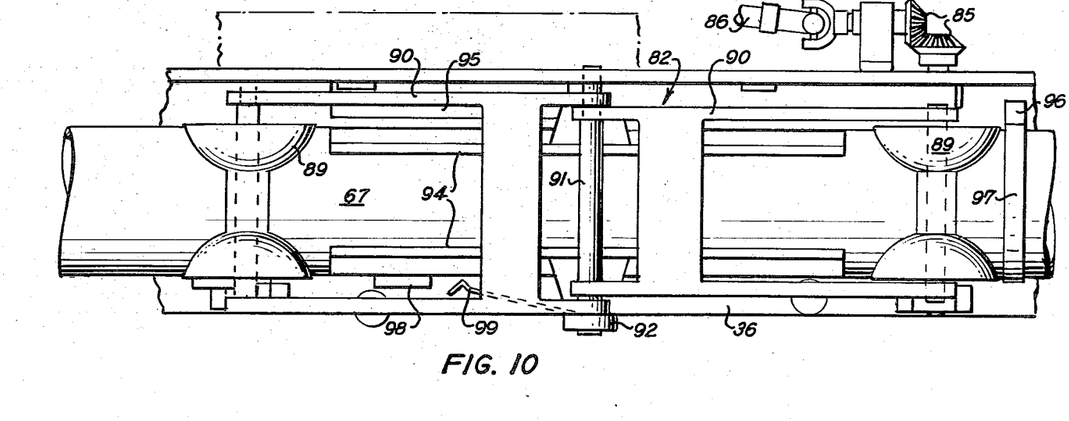
FIG. 10 is a plan view of the same.

The apparatus further comprises means to engage and pick up irrigation pipe in the field and to feed and uncouple the pipe sections prior to presenting the same individually to the above-described vertical and horizontal conveyor means which carries the sections to the elevator platform 48 and rack 45. This additional means comprises a leading engaging and feeding unit 82, the details of which are shown in FIGS. 8 through 10. The unit 82 comprises a lower pair of longitudinally spaced and aligned free-turning rollers 83 journaled in bearings 84 which are mounted directly on the fixed angle bar 36. When the trailer 25 has its forward end titled downwardly for picking up pipe by adjustment of the cylinder 30, the horizontal web of angle bar 36 is close to the ground so that the first pipe section in the string of irrigation pipe may easily be engaged with the rollers of unit 82. The rollers 83 are shaped like bar bells and their rounded pipe-engaging heads or flanges are covered with friction material, such as rubber. The leading lower roller 83 is power driven through miter gears 85, in turn driven by a long drive shaft 86 inboard of the angle bar 36 and supported at intervals by transverse braces 87 of the trailer bed 27. A friction drive wheel 88 on the rear end of drive shaft 86 is spring-urged into engagement with the adjacent ground wheel 87 so as to be driven directly thereby when the trailer 25 moves forwardly or rearwardly.

The unit 82 further consists of an upper pair of longitudinally spaced rollers 89 having the same configuration as the lower rollers 83 and arranged directly above the lower rollers so as to engage and cradle each pipe section 67 at four points as indicated in FIG. 8. The upper rollers 89 are also covered with friction material. The upper rollers 89 have a vertical floating action relative to the pipe and lower rollers, being mounted on fore and aft vertically swingable support yokes 90 whose interior ends are pivotally secured at 91 to the vertical web of angle bar 36 and to a fixed upright member 92 rigidly mounted on the outer side of angle bar 36, at the longitudinal center of the unit 82. The upper rollers 89 and their vertically swingable yokes 90 are yieldingly urged into contact with the pipe by retractile springs 93, as shown in FIG. 9. Only the leading lower roller 83 is power driven to feed the pipe sections longitudinally rearwardly as they are successively engaged and picked up in the field by the advancing apparatus. The effective speed of rotation of the driven roller 83 is such that it will move the pipe rearwardly in the apparatus at the same speed that the apparatus advances forwardly. The other rollers 83 and 89 of unit 82 are for guidance of the pipe.

The unit 82 embodies some additional components which are utilized only when pipe is being connected and laid down in the field by the apparatus in the mode shown in FIG. 3. At this time the tractor 26 is coupled to the opposite end of trailer 25 and such end is elevated and the unit 82 is now at the trailing end of the apparatus with the powered roller 83 being driven in the opposite direction by the friction roller 88. In such reverse mode of operation, the unit 82 comprises a fixed center lower guide rail 93 and two upper fixed rails 94 suitably attached to angle bar 36 and member 92, as shown. These three guide rails are provided to assure the proper coupling or joining of the bell and spigot ends of adjacent pipe sections 67 as the latter are being placed in the field. As shown in FIG. 8, the rails 93 and 94 are spaced at approximately equal distances around the circumference of the pipe.

The unit 82 further includes a pair of converging guide or orientation rails 95, attached to the vertical web of angle bar 36, FIG. 8, and cooperating with radial tabs 96 on each pipe section 67, said tabs being carried by bands 97 which surround the pipe sections. As each pipe section 67 is discharged from the trailing end of the apparatus, FIG. 3, the rearwardly converging rails 95 by engaging the tabs 96 and slightly rotating the pipe one way or the other assure the final alignment and orientation of the water discharge gates 98 with which the pipe sections are equipped. It is necessary that these gates 98 all face in the same direction and be at the same elevation from the ground when the pipe is laid down in the field, so that irrigating water will be delivered properly into the furrows between adjacent crop rows. The elements 95 and 96 thus assure a final accurate orientation of the pipe gates. Additional power means to rotate the pipe sections, yet to be described, is provided on the trailer 25 ahead of the described means 95 and 96 when the apparatus is in the pipe laying mode shown in FIG. 3.

Another and final feature of the unit 82 is the provision on the upright member 92 of a spring finger 99 to engage and completely close each sliding gate 98 during the pipe picking up or retrieval operation depicted by FIG. 2. The spring finger 99 upon closing each sliding gate merely trips over the same and cannot interfere with the rearward longitudinal movement of the pipe indicated by the arrow in FIG. 10. The reverse operation is shown in FIG. 3, when the pipe sections are being unloaded and placed in the field properly coupled and arranged for use in the irrigation of crops.

Continuing to refer to the pipe unloading or laying mode, FIG. 3, forwardly of the unit 82 is a main pipe gate orientation means 100 and a coacting gate sensing means 101. These means or devices are shown in detail in FIGS. 15 through 18. The orientation means 100 comprises an electric motor 102 drivingly connected by chain gearing 103 with a pair of friction drive wheels 104 which are adapted to cradle and rotate each pipe section 67 on its axis sufficiently to properly orient the closed gates 98. The two friction rollers 104 are supported by pivoted arms 105 whose lower arms are pivoted at 106 to a fixed support bracket 107 for the device 100. The entire bracket 107 is fixedly attached through a flange 108, FIG. 15, to one side of the trailer bed 27. The vertically swingable pivot arms 105 are interconnected by a hydraulic cylinder 109 which is extended by hydraulic pressure and retracted by a spring to draw the two rollers 104 together to lift the pipe section 67 slightly to the position shown in full lines in FIG. 17. In such elevated position, the pipe is out of contact with the longitudinal driving and accelerating means of FIGS. 11 through 14, yet to be described. While in such position, the rollers 104 can rotate each pipe section in the direction of the arrow 110, FIG. 17, to move the gates 98 to the desired position shown in full lines in FIG. 17. When this position is achieved, the operation of motor 102 is interrupted and the cylinder 109 is extended to lower the pipe section 67 into contact with the driving means in FIGS. 11 through 14, to be described.

To properly control the described operation of the powered orientation means 100, the aforementioned sensing means 101 is utilized in the following manner. Another support bracket 111 on the trailer bed 27 supports a gang of pipe gate feeler fingers 112 carried by a rocker shaft 113 journaled on the support bracket 111. This rocker shaft carries at one end a crank arm 114 which, upon movement in one direction in response to displacement of a finger 112 by a pipe gate 98, operates a combination electrical limit switch 115 to interrupt the operation of electric motor 102 and thereby stop the rotation of pipe section 67 so that gate 98 will stop in the desired position shown in broken lines in FIG. 18 and in full lines in FIG. 17. Simultaneously, the combination limit switch 115 will close a circuit to a solenoid-operated control valve for the hydraulic cylinder 109 to cause the extension of this cyclinder and the lowering of the pipe section 67 to the broken line position shown in FIG. 17. At this time, as stated, the pipe will rest on and be supported by the drive means of FIGS. 11 through 14 and the rollers 104 will be clear of the pipe and in their fully separated positions shown in broken lines in FIG. 17. In such positions, the rollers 104 cannot impart rotation to the pipe.

Additional switches 116 and 117 may be mounted on the bracket 111 so as to be operated by the crank arm 114. When the device 100 is actively elevating the pipe section 67 prior to the displacement of feeler fingers 112 by a pipe gate 98, crank 114 will open switch 116 preventing the control valve for cylinder 109 from causing extension of this cylinder. Simultaneously, switch 117 will be closed by crank arm 114 activating electric motor 102 which rotates the pipe section until the finger 112 is displaced by a pipe gate, opening switch 115 and stopping the electric motor.

The final major component of the pipe handling apparatus comprises an additional pipe moving and accelerating power drive unit 118 located on the same side of the trailer bed 27 as the components or units 82, 100 and 101. As shown in FIGS. 1 and 2, the unit 118 is disposed between the units 100 and 101, the latter being arranged slightly rearwardly of frame post 34, whereas the unit 118 is forwardly of this post and supported on the trailer bed 27 by a support bracket 119.

The power drive unit 118 is utilized during the pipe retrieval and loading mode of operation, FIG. 2, to separate or uncouple the bell and spigot ends of adjacent pipe sections 67 so that the individual sections may be handled by the vertical and horizontal chain conveyors and the associated platform 48 and pipe rack 45, as described. In the unloading and pipe placing mode, FIG. 3, the unit 118 is employed reversely to assemble the bell and spigot ends of the string of pipe sections 67 being laid down in a field. To perform these operations, the drive rollers of the unit 118 must be capable of advancing the pipe at an accelerated rate compared to the advancement of the pipe by the power driven roller 83 of unit 82.

More particularly, the power drive unit 118 consists of a lower relatively stationary friction-coated bar bell roller 120 journaled for rotation on the bracket 119 and driven by gearing 121 from a hydraulic motor 122 on the bracket 119. The unit further comprises a movable upper roller 123 of like formation journaled on a shaft 124 and which shaft carries a gear 125 adapted to mesh with a lower gear 126 on a short shaft 127 which also carries a sprocket gear 128 driven by a chain 129 at the outer side of the unit, FIG. 11. The lower end of this vertical chain engages another sprocket gear 130 on the shaft or axle 131 of the lower driven roller 120.

Figures 11, 12, 13, 14:
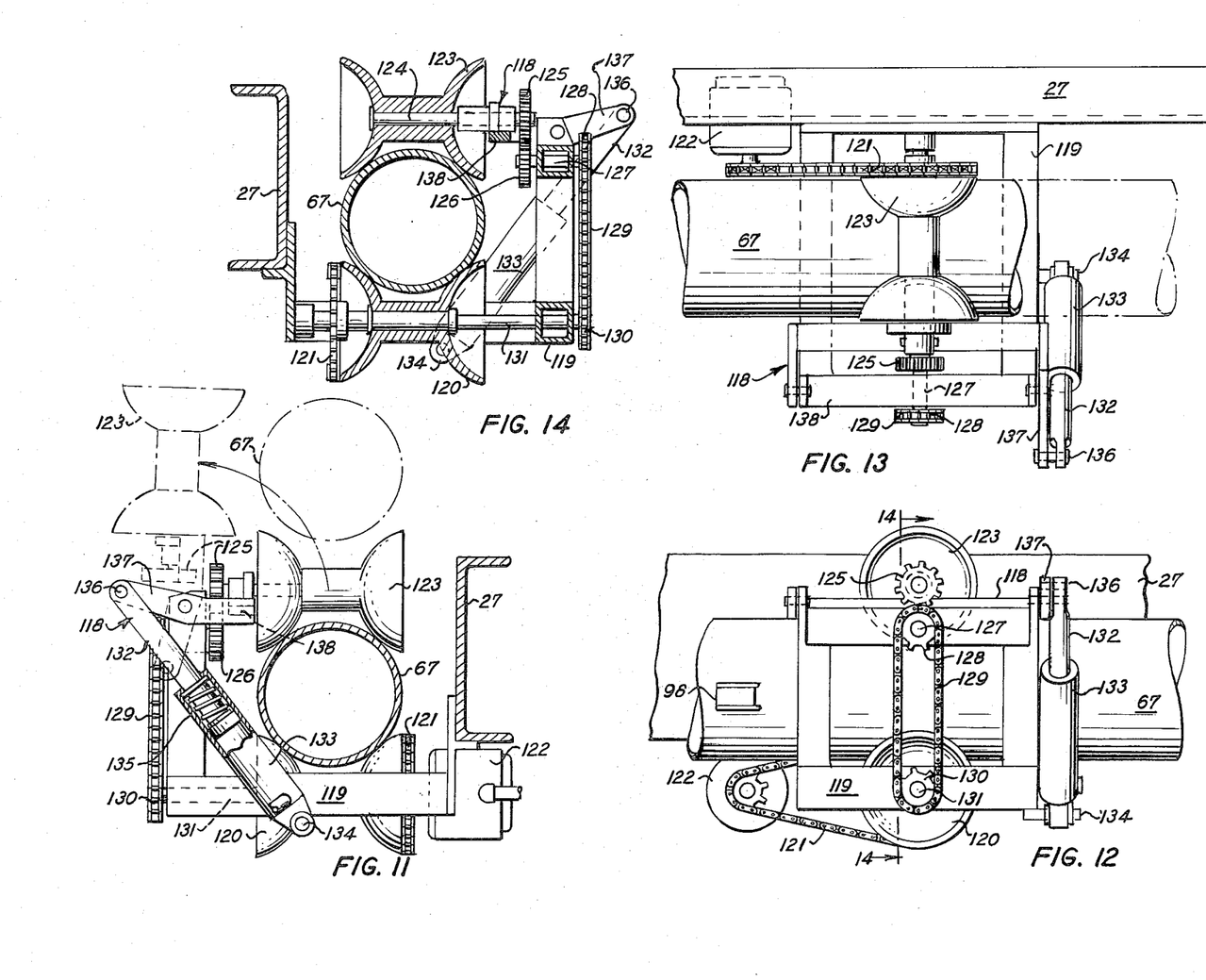
FIG. 11 is an enlarged fragmentary vertical section taken on line 11—11 of FIG. 2 illustrating pipe separating and coupling power driven means.
FIG. 12 is a side elevational view of the same.
FIG. 13 is a top plan view of the same.
FIG. 14 is a vertical section taken on line 14—14 of FIG. 12.

The upper driven roller 123 with its gear 125 is swingable from the down or active position shown in full lines in FIG. 11 to an upstanding inactive position clear of the pipe sections 67 as shown in broken lines. This swinging movement is under control of an extendable piston rod 132 in a hydraulic power cylinder 133 attached to the bracket 119 at 134. The piston rod 132 is biased into the cylinder by a return spring 135 therein. The piston rod 132 is pivotally connected at 136 to a lever 137 and associated support 138 for the upper roller 123. The arrangement is such that fluid pressure extension of the rod 132 swings the roller 123 down into driving engagement with each pipe section 67 directly above the lower roller 120 which is also power driven by the hydraulic motor 122. When pressure is relieved in the cylinder 133, the upper roller 123 is urged by the spring 135 to the inactive position shown in FIG. 1 in broken lines.

As stated, the power drive unit 118 is periodically activated during both the pipe laying and retrieving operations so as to act on each pipe section 67 for coupling it with another pipe section in the laying operation, FIG. 3, and for separating adjacent pipe sections in the retrieving and loading operation, FIG. 2. The hydraulic motor 122 is controlled by a solenoid-operated valve and associated limit switches, to be described in connection with FIG. 19. It may now be understood that the two pipe driving units 82 and 118 are both employed in concert during the retrieval or laying down of irrigation pipe. The pipe gate orientation devices 100 and 101 are utilized only during the operation of laying down the pipe in the field, FIG. 3.

Figure 19:
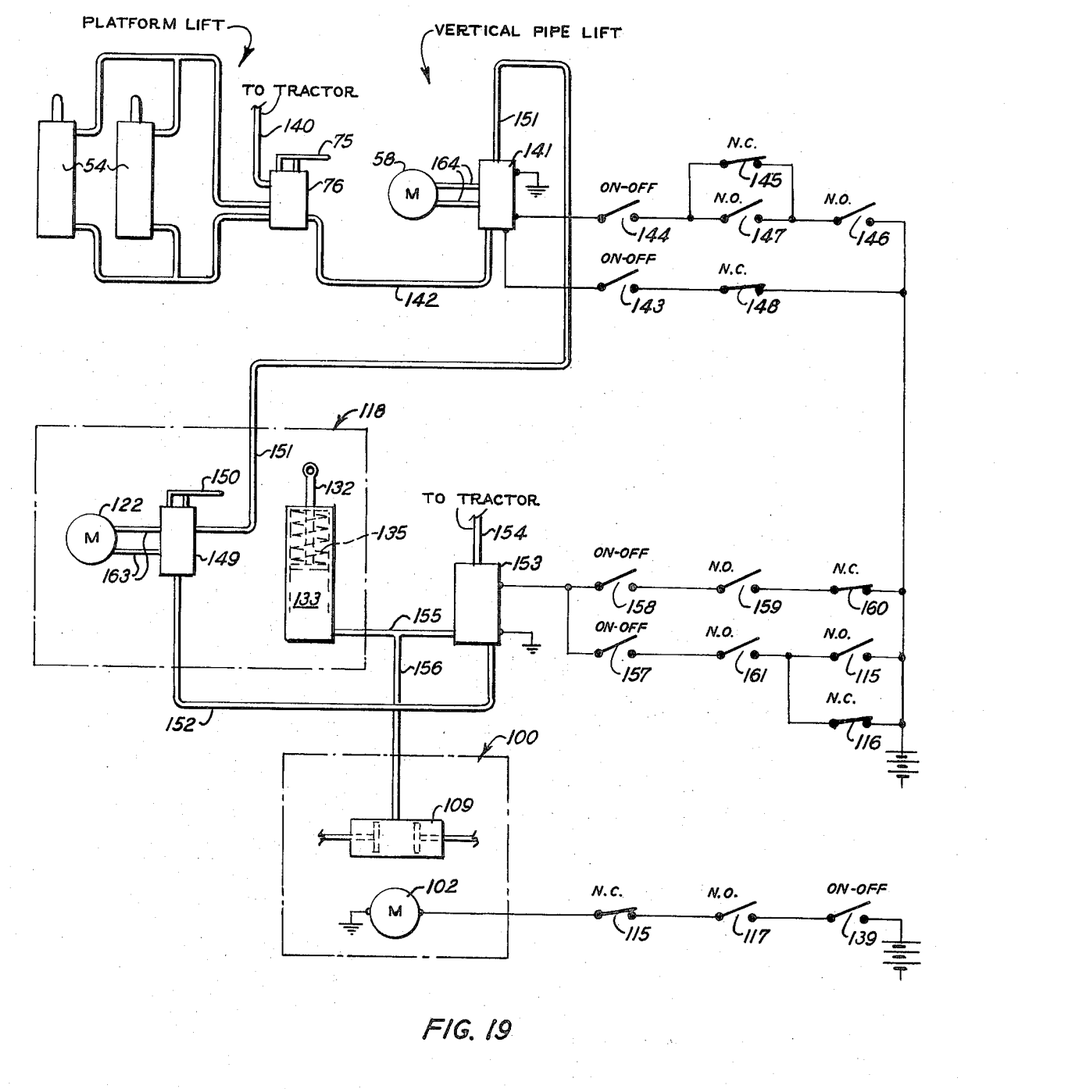
FIG. 19 is a schematic view showing the electrical and hydraulic control circuits for the apparatus.

The operation of the apparatus may be summarized by reference to schematic FIG. 19 which shows the various switches and electrically controlled valves for the hydraulic and electrically powered components of the system. The apparatus has a hydraulically powered winch drum 31 for the purpose already mentioned, and a power cylinder 30 to regulate the inclination of the bed 27, FIGS. 2 and 3. One lower roller 83 of pipe driving and guiding unit 82 is powered to move the pipe at ground speed by friction drive roller 88 engaging wheel 28. The vertical and horizontal pipe chain conveyors 56 and 72 are powered by hydraulic motor 58 and the associated elevating platform 48 is powered by hydraulic cylinders 54. The pipe orientation rollers 104 are powered by electric motor 102 under control of gate feeler fingers 112 and associated switches 115, 116 and 117. Finally, the pipe assembling and separating or accelerating power drive unit 118 is powered by hydraulic motor 122. While it is thought to be well within the skill of the artisan to properly correlate and time the operation of these power devices, FIG. 19 has been provided to show schematically the arrangement of the basic hydraulic and electrical controls for the system.

Figures 15, 18:
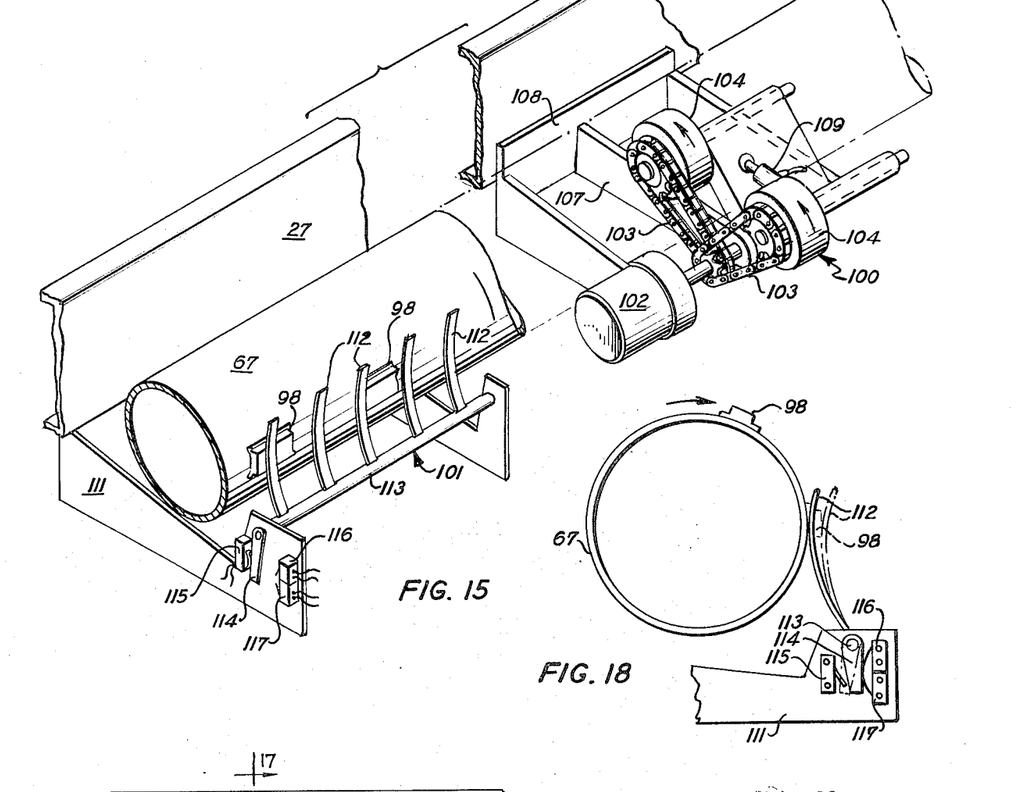
FIG. 15 is a fragmentary perspective view of automatic power driven pipe section orientation means.
FIG. 18 is a fragmentary end elevation of gate feeler means forming a part of the orientation means.
Figures 16, 17:
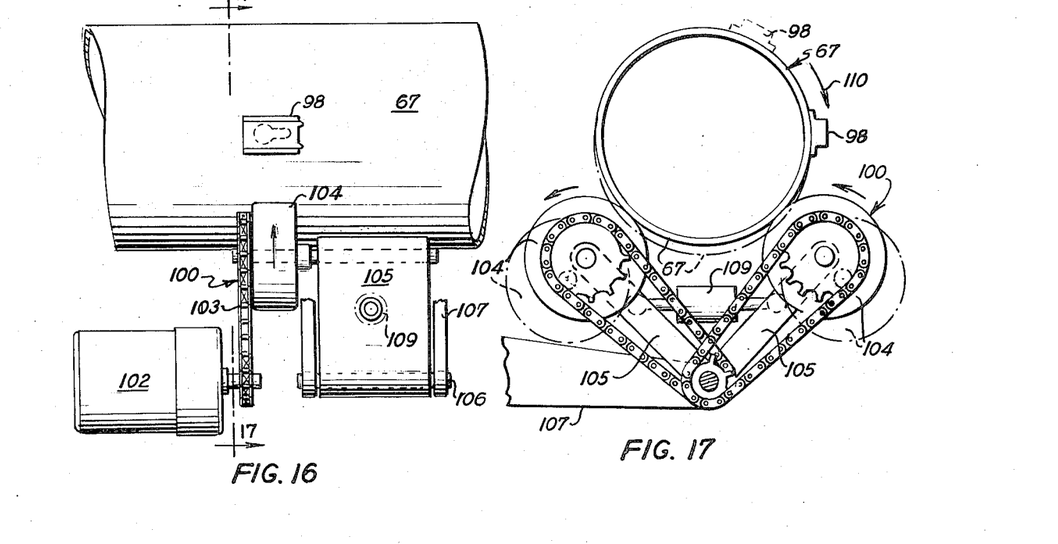
FIG. 16 is a fragmentary side elevation of the power means for rotating pipe sections in the orientation process.
FIg. 17 is a vertical section taken on line 17—17 of FIG. 16.

In this figure, the pipe gate orientation drive device 100 is shown separately from the other components as this device is employed only during pipe unloading, FIG. 3, to orient the gates 98 in conjunction with the gate sensing or feeler means 101, FIG. 15. A manual on and off switch 139 for unit 100 is provided at any convenient location and the previously noted switches 115 and 117 are indicated in the diagram.

With further reference to FIG. 19, the two power cylinders 54 for platform 48 are shown associated with the hydraulic control valve 76 for the two cylinders and the associated lever 75 which is engaged by the first pipe section 67 as described in connection with the racking of pipe, FIG. 5. The valve 76 is pressurized from the hydraulic system of the tractor 26 and the return line to the tractor is indicated at 140 in FIG. 19.

The hydraulic motor 58 for the vertical and horizontal pipe conveyor chains is shown associated with its solenoid-operated valve 141 which is connected with the valve 76 by a hydraulic line 142. Switches 143 and 144 are merely conveniently located on-off switches for pipe unloading and loading, respectively, while the associated limit switches controlling the vertical and horizontal chain conveyors are indicated at 145, 146, 147 and 148, all connected in circuit with the solenoid-operated control valve 141.

The power drive unit 118, FIG. 19, includes the hydraulic motor 122 in circuit with a hydraulic control valve 149 having an actuator 150 which is influenced by the lowering of drive roller 123, FIG. 11, to start the hydraulic motor 122 for powering the two rollers 120 and 123. The two valves 149 and 141 are connected by a hydraulic line 151 and the valve 149 is connected by another line 152 with a solenoid-operated valve 153 pressurized from the tractor hydraulic system through a line 154. The valve 153, in turn, is connected by lines 155 and 156 with the power cylinder 133 of power drive unit 118 and with the extension cylinder 109 of pipe orientation unit 100, all previously described in detail. Also shown in the diagram, FIG. 19, are conveniently located on and off switches 157 and 158 for pipe unloading, FIG. 3, and pipe loading, FIG. 2, as well as strategically located limit switches 159, 160, 161, 115 (second component) and 116, see FIG. 15.

In the pipe picking up or loading operation, FIG. 2, hydraulic motor 122 is reversed for counter-clockwise operation by reversing lines 163 between motor 122 and valve 149. This enables the pipe accelerating drive rollers 120 and 123 to uncouple or separate the oncoming pipe sections 67 prior to elevating and racking them. Switches 158 and 144 are closed and switches 143 and 157 are opened. The trailer 25, FIG. 2, is pulled by the tractor along the string of pipe in the field and the first pipe section 67 is manually placed between the two leading rollers 83 and 89 of drive and guidance unit 82. As the trailer moves forwardly, the pipe is fed rearwardly by unit 82 and over additional guide rollers 162, FIG. 1, on angle bar 36 until the pipe closes limit switch 147 located beneath the pipe somewhat rearwardly of unit 82. The pipe continues to move toward the rear until it engages and closes limit switch 159 near the rear of the trailer, which switch controls the solenoid-operated valve 153. This activates power drive unit 118, FIGS. 11 through 14, lowering upper roller 123 and thereby opening control valve 149, starting up hydraulic motor 122 of unit 118. The starting of this motor will effectively separate or uncouple the two adjacent pipe sections 67 being acted upon.

When a pipe section 67 has reached the rear of the trailer, the rear upper roller 89 of unit 82 drops downwardly and opens limit switch 160 located therebelow, thus stopping power drive unit 118 and closing switch 146 which starts up the vertical chain conveyor 56 which elevates the first pipe section 67 upwardly, opening limit switch 147 (switch 145 was closed because previously there was no pipe in the vertical chain conveyor). The pipe section 67 is elevated until it opens limit switch 145 which stops the vertical conveyor. While the pipe section is being elevated on conveyor chains 56, the oncoming second pipe section moving onto the trailer closes switch 147 and moves toward the rear of the trailer, restarting the cycle of operation over again. It will be noted that during the above pipe retrieving and racking operation, the pipe gate orientation means 100 and 101 is not utilized.

With these orientation devices in use, the unloading or pipe laying operation, FIG. 3, is described as follows. Switches 144 and 158 are opened and switches 143, 157 and 139 are closed and hydraulic motor 122 is set for clockwise operation by reversing lines 163 between motor 122 and the valve 149. The position of the spring on the dog 68 is changed for unloading. The operator pressurizes the hydralic system by the usual control valve on the tractor and this starts hydraulic motor 58 which has been reversed from load direction by reversing the two hydraulic lines 164 between motor 58 and valve 141, FIG. 19. This reverse operation of motor 58 will lower a pipe section 67 on chain conveyor 56 until such pipe section contacts rollers 104 of orientation device 100, which rollers hold the pipe section slightly elevated from contact with roller 120 of power drive unit 118. Simultaneously, the pipe opens switch 116, FIGS. 15 and 18, opening the circuit to solenoid valve 153, preventing it from operating. When the pipe opens switch 116, it also closes switch 117, FIGS. 15 and 18, which activates orientation unit 100 having electric motor 102 and this causes rotation of the pipe section until gate feeler fingers 112 detect a gate and are displaced to open limit switch 115 and close limit switch 115 (second component). Switch 115 opens the circuit to motor 102 stopping it. The same combination switch 115 closes the circuit to valve 153 by circumventing limit switch 116. This, in turn, causes hydraulic cylinder 109 to spread or separate arms 105, FIG. 17, so that pipe section 67 is lowered slightly into contact with roller 120. Switch 115 also activated cylinder 133 of unit 118 to extend same, and when fully extended, FIG. 11, hydraulic motor 122 is started up by valve 149 connected through line 152 and valve 153 with cylinder 133. Motor 122 and active rollers 120 and 123, FIG. 11, now drive the pipe off of the trailer, FIG. 3, until the pipe passes over switch 161 which stops motor 122 and allows spring 135 to retract piston rod 132 and raise roller 123 of unit 118. At this point, the pipe section 67 has moved far enough on the trailer so that rollers 83 and 89 of unit 82 have a firm grip on the end of the pipe section and feed it off of the trailer at ground speed, adjacent pipe sections 67 having had their bell and spigot ends properly telescoped by the action of the unit 118. When switch 161 was closed, the arms 105 were brought together by a spring means, not shown, ready for another cycle of operation.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A pipe handling apparatus comprising a wheeled trailer adapted to be towed along a string of pipe consisting of separable pipe sections having interfitting bell and spigot ends, means to adjust the longitudinal inclination of the trailer so that one end thereof may be positioned close to the ground, a first power pipe feeding and guiding unit on said trailer near said one end to engage pipe sections and feed them longitudinally of the trailer while the trailer is being drawn lengthwise of said string, a second intermittently operable feeding and guiding means for pipe sections on said trailer spaced longitudinally of said first feeding and guiding unit and adapted to feed pipe sections at a greater rate of movement than said first unit to separate or assemble said bell and spigot ends, substantially vertical and horizontal pipe section conveyor means on said trailer to elevate separated pipe sections and transport them laterally from one side of the trailer to a position substantially directly thereabove, vertically movable pipe supporting platform means on the trailer below said horizontal conveyor means and receiving layers of pipe sections from the horizontal conveyor means, and a pipe rack removably mounted on the trailer adjacent to said platform means and receiving said layers of pipe sections in stacked relation and confining them when said platform means is in a lowered position.

2. The structure of claim 1, and an additional selectively operable power means on said trailer spaced from said first feeding and guiding unit and said second feeding and guiding means and operable to revolve pipe sections on their longitudinal axes to orient pipe water discharge gates while said apparatus is moving in one direction to lay down a string of pipe with the pipe sections thereof properly assembled for use.

3. The structure of claim 2, and pipe gate feeler means on said trailer associated with said additional selectively operable power means to initiate and terminate the operation thereof in response to contact or non-contact of the feeler means with gates of pipe sections.

4. The structure of claim 3, and said additional selectively operable power means comprising a pair of spaced power driven rollers to support pipe sections and turn them on their axes, and power means connected with said rollers to shift the rollers toward or away from each other for elevating or lowering pipe sections slightly relative to said second intermittently operable feeding and guiding means.

5. The structure of claim 3, and said feeler means comprising a rocker shaft, spaced gate feeler fingers on said rocker shaft, a crank extension on said rocker shaft, and control switch means for said additional selectively operable power means in the path of movement of said crank extension.

6. The structure of claim 1, and said first power pipe feeding and guiding unit disposed at one side of said trailer and including a lower pair of relatively fixed pipe engaging rollers, mens to power one of said lower rollers and operated by one ground wheel of the trailer so that said first pipe feeding and guiding unit may feed pipe longitudinally of the trailer in either direction of movement of the trailer approximately at trailer ground speed, an upper pair of pivotal vertically swingable pipe guiding rollers above said lower pair and floatingly engaging the upper side of the pipe being fed and guided by said first unit, resilient means yieldingly urging said upper rollers into engagement with said pipe, and additional guidance means on said first unit to assure proper alignment of said pipe bell and spigot ends.

7. The structure of claim 6, and an element on said first unit in the path of movement of pipe gates and engaging said gates during the movement of pipe by said first unit in one direction to close said gates.

8. The structure of claim 7, and said element consisting of a spring finger adapted to contact said gates and to yield so that the gates may pass the spring fingers.

9. The structure of claim 6, and additional pipe gate orientation means on said first unit cooperating with a projection on each pipe section to slightly rotate each pipe section as the same is being discharged from the apparatus to assure a final accurate positioning of pipe gates.

10. The structure of claim 9, and said additional orientation means comprising a pair of converging guide rails on one side of said first unit, said projection on each pipe section being a fixed radial element which passes between said converging rails to be engaged and turned thereby circumferentially with each pipe section during said final accurate positioning.

11. The structure of claim 1, and said vertically movable platform means comprising a substantially level platform, and power-operated movable linkage means on said trailer connected with and supporting said platform means while raising and lowering the platform means and maintaining the same level in all adjusted positions.

12. The structure of claim 11, and said power-operated linkage means comprising an upstanding power cylinder on said trailer adjacent opposite sides of said platform means, and a linkage interconnecting each said cylinder and platform means and each linkage including an arm pivoted to said trailer for vertical swinging movement to raise and lower the platform means.

13. The structure of claim 1, and said second feeding and guiding means for pipe sections comprising upper and lower pipe engaging rollers, power means to raise and lower the upper roller so that successive pipe sections may enter upon the lower roller, and means to power both rollers in unison when the upper roller is in an active pipe engaging position.

14. The structure of claim 13, and said means to power both rollers comprising a motor, gearing operatively connecting said motor with said lower roller, a gear on said movable upper roller, and gearing including a stationary gear adapted to mesh with said gear of the upper roller when the latter is in said active pipe engaging position, said last-named gearing operatively connected with and driven by the lower roller.

15. The structure of claim 13, and said power means to raise and lower the upper roller comprising a rocker support for the upper roller enabling it to swing vertically from a substantially vertical to a substantially horizontal position, and a power cylinder connected with said rocker support to swing the latter with the upper roller vertically relative to the lower roller.

16. The structure of claim 1, and said pipe rack comprising a pair of upwardly open U-shaped frames resting on the bed of said trailer adjacent to said platform means.

17. The structure of claim 16, and separable tie rods for said pipe rack frames enabling them to be integrated for unloading as a unit from the trailer bed when the platform means is in a down position below said U-shaped frames.

18. The structure of claim 1, and said wheeled trailer having a bed frame, an upstanding rectangular framework on the bed frame including a pair of posts offset outwardly from one side of the bed frame, said vertical pipe section conveyor means consisting of endless flexible conveyor elements on said offset posts having projecting pipe lifting elements thereon at spaced intervals.

19. The structure of claim 18, and cam tracks on said offset posts having projections near their tops to automatically collapse said projecting pipe lifting elements during transfer of pipe sections from said vertical conveyor means to said horizontal conveyor means.

20. The structure of claim 19, and spring-urged transfer dogs on said rectangular framework near the top of the vertical conveyor means to support pipe sections during the transfer thereof from the vertical conveyor means to the horizontal conveyor means following the collapse of said pipe lifting elements.

21. The structure of claim 20, and said pipe lifting elements comprising pipe lifting pins pivoted to said flexible conveyor elements of the vertical conveyor means, and rigid angularly disposed cam track followers on said pins.

22. The structure of claim 18, and said upstanding rectangular framework including a pair of end transverse frame bars, and said horizontal pipe section conveyor means consisting of endless flexible conveyor elements on said transverse frame bars operatively connected with and driven by said vertical conveyor elements and having spaced projecting pipe pusher elements to shift pipe sections horizontally inwardly from the vertical conveyor means to form layers of pipe sections on said platform means.

23. The structure of claim 22, and spring-urged pipe section transfer dogs on said upstanding framework near the top of the vertical conveyor means to support successive pipe sections during the transfer thereof from said vertical to said horizontal conveyor means.

24. The structure of claim 22, and a control means for the operation of said vertically movable platform means on said rectangular framework in the path of movement of pipe sections being shifted horizontally inwardly by the pusher elements of the horizontal conveyor means, whereby the platform means may be lowered in controlled increments to receive successive layers of said pipe sections.

25. A pipe handling apparatus comprising an elongated trailer bed having a pair of ground wheels intermediate its ends so that the bed may be tilted, an upstanding framework on the trailer bed, vertical and horizontal power conveyor means on said framework for elevating pipe sections in succession near one side of said bed and then transferring them laterally in succession toward the other side of said bed, vertically moving elevator platform means for horizontal layers of pipe sections above said bed and within said framework, a coacting pipe supporting and confining rack removably mounted on said bed adjacent to said platform means to receive stacked layers of pipe from the platform means when the latter is in a lowered position, and power-operated pipe feeding means on said trailer bed at one side thereof to deliver separated pipe sections in succession to said vertical conveyor means.

26. The structure of claim 25, and a winch on said trailer bed near one end thereof to pull a loaded rack onto said bed.

27. The structure of claim 25, and said power-operated pipe feeding means comprising first and second power units to feed pipe sections at different speeds so that bell and spigot ends of adjacent sections can be assembled or separated by the apparatus.

28. The structure of claim 27, and additional power means substantially in line with said first and second power units to rotate pipe sections on their longitudinal axes for the purpose of orienting water discharge gates of the pipe sections.

* * * * *